US012194848B2

(12) United States Patent
Emura et al.

(10) Patent No.: US 12,194,848 B2
(45) Date of Patent: Jan. 14, 2025

(54) CONTROLLER, VEHICLE, CONTROL METHOD CONTROLLING A PLURALITY OF PARAMETERS

(71) Applicant: Panasonic Intellectual Property Management Co., Ltd., Osaka (JP)

(72) Inventors: Koichi Emura, Kanagawa (JP); Ying Li, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 1164 days.

(21) Appl. No.: 17/014,906

(22) Filed: Sep. 8, 2020

(65) Prior Publication Data

US 2020/0398667 A1     Dec. 24, 2020

Related U.S. Application Data

(63) Continuation of application No. PCT/JP2019/009787, filed on Mar. 11, 2019.

(30) Foreign Application Priority Data

Mar. 13, 2018   (JP) .................................. 2018-045157

(51) Int. Cl.
*B60K 35/00* (2024.01)
*B60K 35/10* (2024.01)
(Continued)

(52) U.S. Cl.
CPC ............. *B60K 35/00* (2013.01); *B60K 35/10* (2024.01); *B60N 2/20* (2013.01); *G02B 27/0179* (2013.01);
(Continued)

(58) Field of Classification Search
CPC .................... B60K 35/00; B60K 37/06; B60K 2370/1529; B60K 2370/146; B60N 2/20;
(Continued)

(56) References Cited

U.S. PATENT DOCUMENTS 9,753,289 B2   9/2017  Hirokawa et al.
10,882,419 B2  1/2021  Wolf
(Continued)

FOREIGN PATENT DOCUMENTS

DE   102015206501 A1   10/2016
DE   102015116160 A1   3/2017
(Continued)

OTHER PUBLICATIONS

English Translation for JP2003312312A (Year: 2023).*
(Continued)

*Primary Examiner* — Mahmoud S Ismail
(74) *Attorney, Agent, or Firm* — Seed IP Law Group LLP

(57) ABSTRACT

A controller is connected to a seat for which a backward tilt angle of a backrest can be changed and to a display device for which an angle of projection of a display light can be changed. An acknowledgment unit acknowledges a selection of one of a plurality of items of identification information. A control unit acquires, when the acknowledgment unit acknowledges a selection of one of the plurality of items of identification information, a backward tilt angle and an angle of projection corresponding to the selected identification information from a storage to control the seat so that a first angle determined by the backward tilt angle acquired is set as the backward tilt angle of the backrest and to control the display device so that a second angle determined by the angle of projection acquired is set as the angle of projection of the display device.

15 Claims, 15 Drawing Sheets

(51) Int. Cl.
 *B60N 2/20* (2006.01)
 *G02B 27/01* (2006.01)
 *B60K 35/23* (2024.01)
 *G06F 3/01* (2006.01)
 *G06F 3/0482* (2013.01)
 *G06V 40/16* (2022.01)
 *G10L 17/00* (2013.01)

(52) U.S. Cl.
 CPC ........ *B60K 35/23* (2024.01); *B60K 2360/146* (2024.01); *G02B 2027/0181* (2013.01); *G06F 3/017* (2013.01); *G06F 3/0482* (2013.01); *G06V 40/172* (2022.01); *G10L 17/00* (2013.01)

(58) Field of Classification Search
 CPC ........ G02B 27/0179; G02B 2027/0181; G06V 40/172; G06F 3/017; G06F 3/0482; G10L 17/00
 USPC .......................................................... 701/49
 See application file for complete search history.

(56) References Cited

U.S. PATENT DOCUMENTS

| | | | |
|---|---|---|---|
| 2005/0162340 A1 | 7/2005 | Nagano et al. | |
| 2009/0237803 A1* | 9/2009 | Hotta | G02B 3/005 |
| | | | 359/630 |
| 2014/0159886 A1 | 6/2014 | Hasegawa et al. | |
| 2016/0209663 A1 | 7/2016 | Hirokawa et al. | |
| 2018/0029501 A1* | 2/2018 | Wolf | B62D 1/181 |
| 2020/0171950 A1* | 6/2020 | Wieczorek | B60K 35/60 |
| 2023/0226910 A1* | 7/2023 | Kim | B60N 2/72 |
| | | | 701/36 |

FOREIGN PATENT DOCUMENTS

| | | | | |
|---|---|---|---|---|
| JP | 61-188236 A | | 8/1986 | |
| JP | 5-18949 U | | 3/1993 | |
| JP | 2003312312 A | * | 11/2003 | ............. B60K 35/00 |
| JP | 2010-176487 A | | 8/2010 | |
| JP | 2015-60180 A | | 3/2015 | |
| JP | 2017-178131 A | | 10/2017 | |
| WO | 2013/005293 A1 | | 1/2013 | |

OTHER PUBLICATIONS

International Search Report, dated May 14, 2019, for International Application No. PCT/JP2019/009787, 4 pages.

German Office Action dated Dec. 20, 2023, for the corresponding German Patent Application No. 112019001300.9. (22 pages) (with English Translation).

* cited by examiner

FIG.5

| BUTTON | BACKWARD TILT ANGLE | ANGLE OF PROJECTION |
|--------|---------------------|---------------------|
| 1 | A1 | B1 |
| 2 | A2 | B2 |
| 3 | A3 | B3 |

210

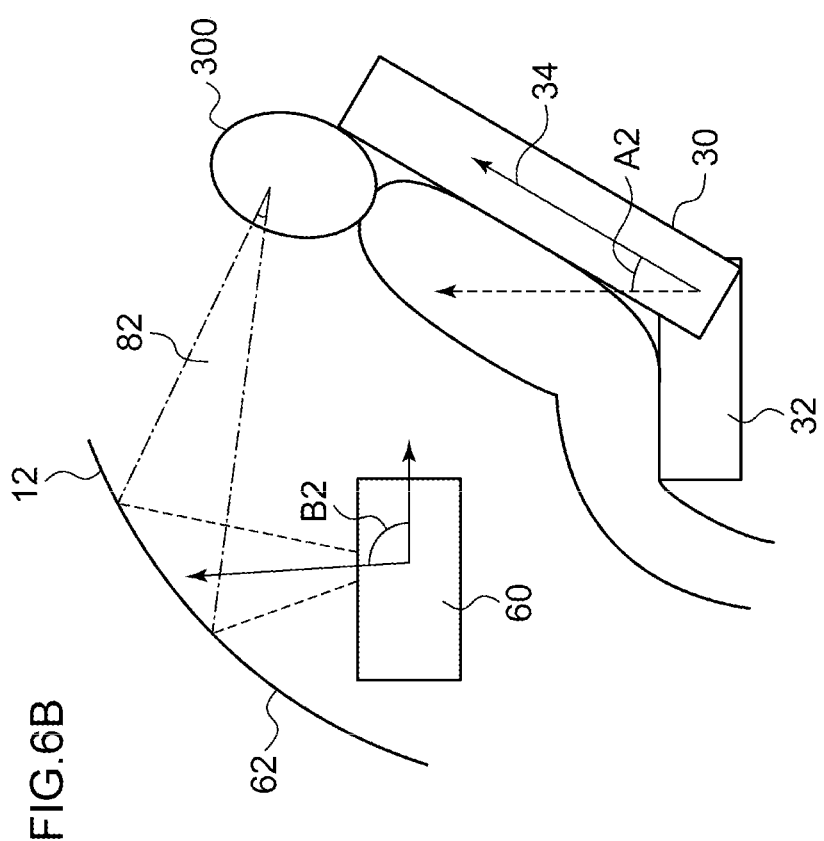
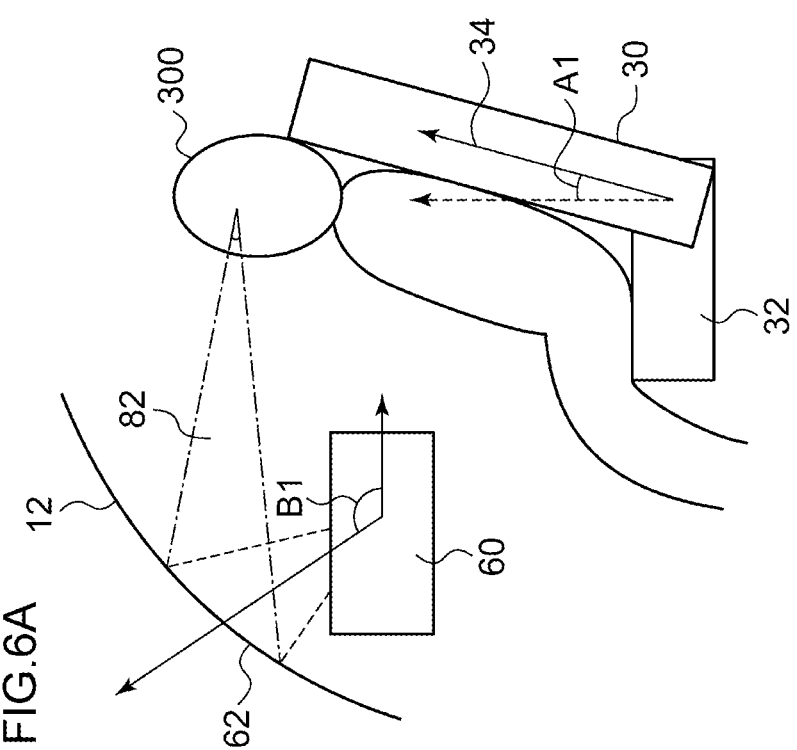

FIG.11

| BUTTON | AUTOMATIC DRIVING | | MANUAL DRIVING | |
|---|---|---|---|---|
| | BACKWARD TILT ANGLE | ANGLE OF PROJECTION | BACKWARD TILT ANGLE | ANGLE OF PROJECTION |
| 1 | A1 | B1 | C1 | D1 |
| 2 | A2 | B2 | C2 | D2 |
| 3 | A3 | B3 | C3 | D3 |

| USER OPERATION | CONTENT STORED |
|---|---|
| HOLD | BACKWARD TILT ANGLE, ANGLE OF PROJECTION |
| PRESS TWICE | BACKWARD TILT ANGLE |
| PRESS THREE TIMES | ANGLE OF PROJECTION |

210

CONTROLLER, VEHICLE, CONTROL METHOD CONTROLLING A PLURALITY OF PARAMETERS

CROSS-REFERENCE TO RELATED APPLICATION

This application is based upon and claims the benefit of priority from the prior Japanese Patent Application No. 2018-045157, filed Mar. 13, 2018, the entire contents of which are incorporated herein by reference.

BACKGROUND

Technical Field

The present disclosure relates to a control technology and, more particularly, a controller, a vehicle, and a control method for controlling a plurality of parameters.

Description of the Related Art

Information such as content is displayed on a windshield by a head-up display to display auxiliary information that should be provided to the driver driving a vehicle or to inhibit reduction in the arousal level of the driver during an automatic driving mode. Rules prohibit using an area on the windshield that blocks the field of front vision to display information. According to certain related art, an upper display area and a lower display area are used as display areas to avoid the prohibited area. The upper display area and the lower display area are switched into use according to a mode selected from a plurality of prescribed modes (see, for example, patent literature 1).

PATENT LITERATURE

[Patent Literature 1] JP2017-178131

It should be noted that the optimum display position changes if the reclining angle of the seat in which the user is seated changes. There is room for improvement in the related art in terms of control of the seat angle and the display position.

BRIEF SUMMARY

The present disclosure addresses the above-described issue, and a general purpose thereof is to provide a technology capable of controlling the seat angle and the display position in a simple fashion.

A controller according to an embodiment of the present disclosure is connected to a seat for which a backward tilt angle of a backrest can be changed and to a display device for which an angle of projection of a display light can be changed, and includes: an acknowledgment unit that acknowledges a selection of one of a plurality of items of identification information; a control unit that acquires, when the acknowledgment unit acknowledges a selection of one of the plurality of items of identification information, a backward tilt angle and an angle of projection corresponding to the selected identification information from a storage unit to control the seat so that a first angle determined by the backward tilt angle acquired is set as the backward tilt angle of the backrest and to control the display device so that a second angle determined by the angle of projection acquired is set as the angle of projection of the display device.

Another embodiment of the present disclosure relates to a vehicle. The vehicle includes: a seat for which a backward tilt angle of a backrest can be changed; a display device for which an angle of projection of a display light can be changed; an acknowledgment unit that acknowledges a selection of one of a plurality of items of identification information; a storage unit; and a control unit that acquires, when the acknowledgment unit acknowledges a selection of one of the plurality of items of identification information, a backward tilt angle and an angle of projection corresponding to the selected identification information from the storage unit to control the seat so that a first angle determined by the backward tilt angle acquired is set as the backward tilt angle of the backrest and to control the display device so that a second angle determined by the angle of projection acquired is set as the angle of projection of the display device.

Still another embodiment of the present disclosure relates to a control method. The method is adapted for a controller connected to a seat for which a backward tilt angle of a backrest can be changed and to a display device for which an angle of projection of a display light can be changed, and includes: acknowledging a selection of one of a plurality of items of identification information; acquiring, when a selection of one of the plurality of items of identification information is acknowledged, a backward tilt angle and an angle of projection corresponding to the selected identification information from a storage unit; and controlling, using a processor, the seat so that a first angle determined by the backward tilt angle acquired is set as the backward tilt angle of the backrest and controlling, using the processor, the display device so that a second angle determined by the angle of projection acquired is set as the angle of projection of the display device.

Optional combinations of the aforementioned constituting elements, and implementations of the present disclosure in the form of apparatus, systems, methods, programs, recording mediums recording programs, vehicles in which the device is mounted, etc., may also be practiced as additional modes of the present disclosure.

BRIEF DESCRIPTION OF THE SEVERAL VIEWS OF THE DRAWINGS

FIG. 5 shows a data structure of a table stored in the storage unit of FIG. 2;

FIGS. 6A and 6B show an outline of the operation of the seat of FIG. 3 and the display device of FIG. 4;

FIG. 11 shows a data structure of a table stored in the storage unit of FIG. 10;

FIG. 13 shows a data structure of a table stored in the storage unit of FIG. 12;

DETAILED DESCRIPTION

Some embodiments of the disclosure will now be described by reference to the preferred embodiments. This does not intend to limit the scope of the present disclosure, but to exemplify some embodiments of the disclosure.

Embodiment 1

A brief summary will be given before describing the present disclosure in specific details. This embodiment relates to a vehicle in which a display device for a vehicle such as a head-up display (HUD) is mounted. The head-up display projects a display light output from a display unit onto the front windshield. The virtual image of a display image presented by the display light is superimposed on the scenery viewed through the front windshield, etc., and viewed by the driver. The head-up display displays auxiliary information that should be provided to the driver. In a vehicle driven automatically, the head-up display may display content such as an image. The driver at the seat views the content or the image.

The backward tilt angle of the backrest of the seat occurring while the driver is viewing auxiliary information during a manual driving mode and the backward tilt angle of the backrest of the seat occurring while the driver is viewing content during an automatic driving mode differ. If the display position, i.e., the angle of projection, remains unchanged in the event of a change in the backward tilt angle, viewability experienced by the driver becomes poorer. It is preferred that the angle of projection from the head-up display be adjusted in accordance the backward tilt angle of the backrest in order to inhibit viewability from becoming poorer. Meanwhile, the use of a sensor for detecting the backward tilt angle of the backrest and a sensor for detecting the direction of line of sight of the driver to realize this adjustment makes the configuration complicated. For this reason, it is required to adjust the backward tilt angle and the angle of projection in a coordinated manner and in a simple fashion.

This embodiment takes advantage of the fact that a vehicle is provided with a plurality of buttons for adjusting the backward tilt angle of the backrest. The buttons are capable of setting mutually different backward tilt angles. When one of the buttons is pressed, the reclining angle (backward tilt angle) of the backrest changes to result in the backward tilt angle set for the button. In this embodiment, mutually different angles of projection can also be set for the buttons. In other words, the backward tilt angle and the angle of projection are associated with each other and are set for each button. Therefore, when one of the buttons is pressed, the backward tilt angle set for the button results, and the angle of projection set for the button results.

A description will be given of an embodiment of the present disclosure with reference to the drawings. The embodiments described below are by way of examples only, and the present disclosure is not limited by these embodiments.

Figure 1:
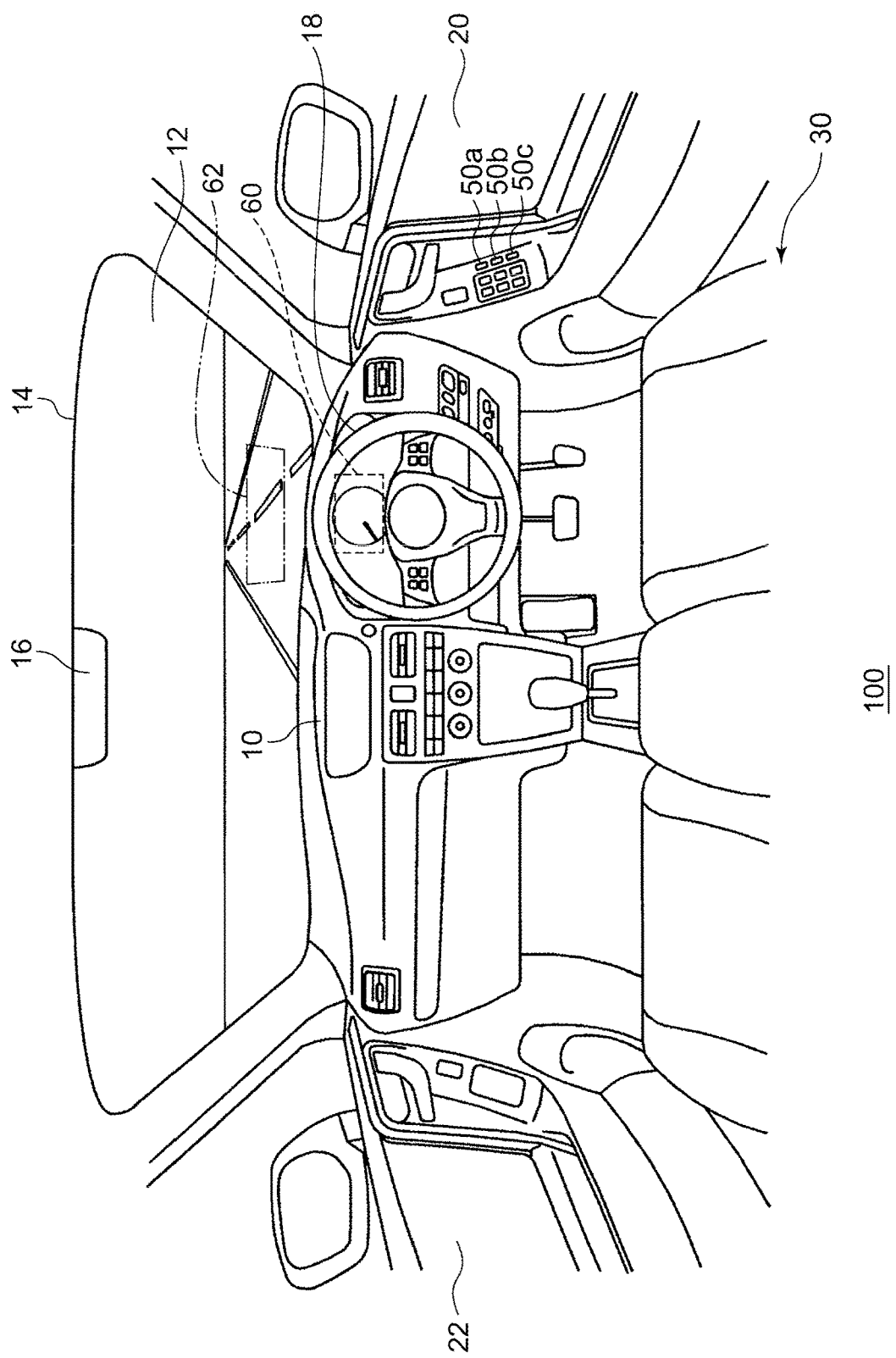
FIG. 1 schematically shows the interior of a vehicle according to embodiment 1.

FIG. 1 schematically shows the interior of a vehicle 100 and shows a configuration revealed when the vehicle interior of the vehicle 100 is viewed from the backward side. A dashboard 10 extending horizontally is provided frontward in the vehicle interior. A front windshield 12 is provided above the dashboard 10, and a ceiling 14 is provided above the front windshield 12, extending backward. Further, a room mirror 16 is provided to project downward from the portion of the ceiling 14 toward the front windshield 12. A steering 18 is provided to the right of the dashboard 10, and a seat 30 is provided behind the steering 18. The seat 30 corresponds to the driver's seat. A seat that is a front passenger seat is provided opposite to the driver's seat in the vehicle 100, but a description of the front passenger seat is omitted below. The positions of the driver's seat and the front passenger seat may be reversed. Further, a right door 20 is provided on the side of the driver's seat, and a left door 22 is provided on the side of the front passenger seat. A first button 50a, a second button 50b, and a third button 50c, which are generically referred to as buttons 50, are provided in the right door 20.

A display device 60 is mounted in the dashboard 10 toward the steering 18. The display device 60 is a head-up display and projects a display light onto a display area 62 on the front windshield 12. The display light reflected in the display area 62 toward the vehicle interior is viewed by the driver seated in the seat 30. The driver can view the virtual image of the image projected by the display device 60 as being superimposed on the scenery in front of the dashboard 10. The display area 62 is provided in a part of the front windshield 12 in front of the driver and has a horizontally elongated rectangular shape. Auxiliary information displayed on the display area 62 includes operation information indicating whether the automatic driving function is activated, positional information indicating the relative position of a target of perception located in the direction of travel that the driver should perceive, and various sorts of vehicle information such as control information on the vehicle 100 used by the automatic driving function. Alternatively, various sorts of content for maintaining the arousal level of the driver while the vehicle 100 is being driven automatically may be displayed in the display area 62. Various sorts content is exemplified by moving images and social networking services (SNS).

Figure 2:
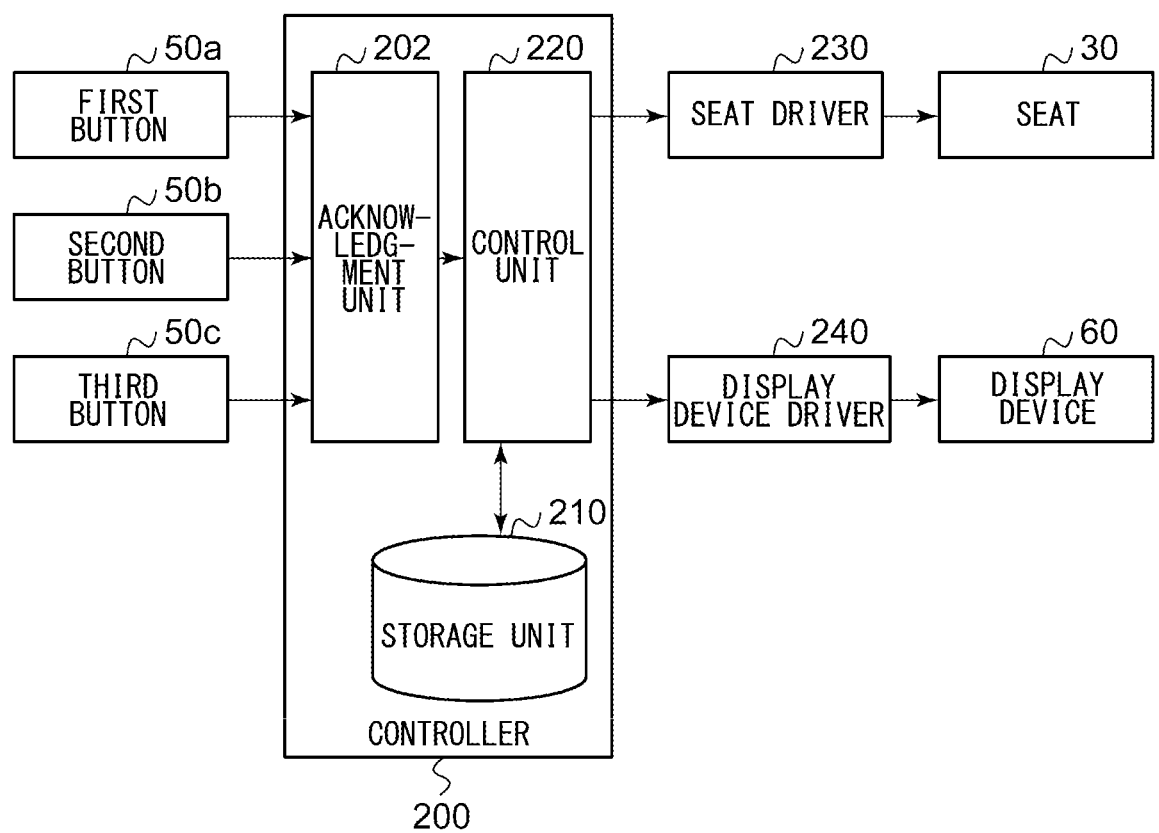
FIG. 2 shows a configuration of the vehicle of FIG. 1.

FIG. 2 shows a configuration of the vehicle 100. The vehicle 100 includes the seat 30, the display device 60, the first button 50a, the second button 50b, the third button 50c, which are generically referred to as buttons 50, a controller 200, a seat driver 230, a display device driver 240. Further, the controller 200 includes an acknowledgment unit 202, a storage unit 210, and a control unit 220. The figure shows a configuration related to control of the seat 30 and the display device 60.

Figure 3:
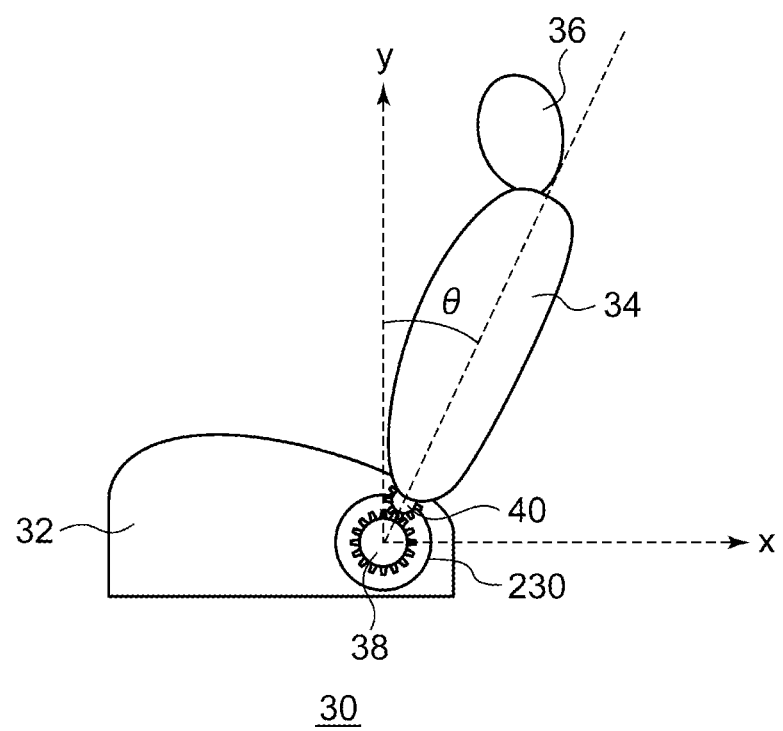
FIG. 3 shows a configuration of the seat of FIG. 2.

As mentioned above, the seat 30 is the driver's seat. FIG. 3 shows a configuration of the seat 30. The figure is a side view of the seat 30 but shows the interior of parts of a seat cushion 32 and a backrest 34 to show the internal configuration clearly. The seat 30 includes the seat cushion 32, the backrest 34, and a headrest 36. The seat cushion 32 includes a first gear 38 and a seat driver 230, and the backrest 34 includes a second gear 40. The seat cushion 32 is the seating face of the seat 30 and is where the driver is seated. The backrest 34 is pivotally connected to the backward portion of the seat cushion 32. The backrest 34 supports the back of the driver seated in the seat cushion 32. The headrest 36 is mounted to the upward portion of the backrest 34. The headrest 36 supports and protects the head and neck of the driver seated in the seat cushion 32.

The seat driver 230 is provided in the backward portion of the interior of the seat cushion 32. For example, the seat driver 230 is comprised of a stepping motor, and the first gear 38 is provided on the rotation axis of the motor. The first gear 38 is in mesh with the second gear 40 provided in the lower portion of the backrest 34. Rotary driving of the seat driver 230 rotates the first gear 38 and the second gear 40 and changes the backward tilt angle θ of the backrest 34 accordingly. Defining the rotation axis of the seat driver 230 to be the origin, and defining an x axis extending backward from the origin and a y axis extending vertically from the origin, the backward tilt angle θ is defined by an angle from the y axis. In other words, the seat 30 is arranged such that the closer the backward tilt angle to "0°," the closer the face of the backrest 34 to the vertical direction, and, the closer the backward tilt angle to "90°," the closer the face of the backrest 34 to the horizontal direction. In other words, the backward tilt angle of the backrest 34 in the seat 30 can be changed. Reference is made back to FIG. 2.

Figure 4:
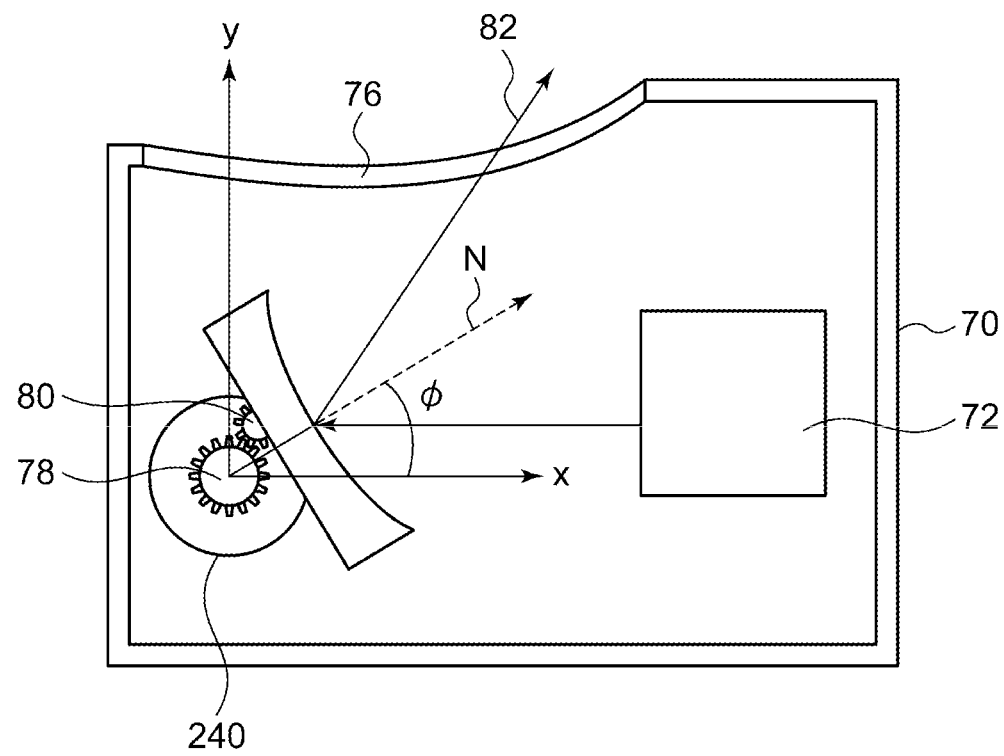
FIG. 4 shows a configuration of the display device of FIG. 2.

The display device 60 projects the display light representing an image, etc., onto the front windshield 12. FIG. 4 shows a configuration of the display device 60. The display device 60 includes a housing 70, a display unit 72, a concave mirror 74, a cover 76, a first gear 78, a second gear 80, and a display device driver 240. The housing 70 is fixed to the vehicle by a fixing member such as a screw. The housing 70 is made of a metallic material and has a substantially box-like shape. Mounting members of various forms (not shown) are provided in the housing 70. For example, the mounting member retains the display unit 72 and the concave mirror 74 in predetermined relative positions. The top surface of the housing 70 opens to output a display light 82 and the cover 76 made of a transparent resin material is mounted to cover the opening.

For example, the display unit 72 includes a liquid crystal panel and a light source embodying a backlight for illuminating the liquid crystal panel from behind with light that is transmitted through the panel. The light ray radiated from the light source is transmitted through collimating optics, diffusing optics, etc., before arriving at the liquid crystal panel. The liquid crystal panel displays an image for presentation on the head-up display. The light entering the liquid crystal panel mirrors the displayed image to cause the display light 82 to be output from the liquid crystal panel toward the concave mirror 74.

The concave mirror 74 is a mirror that embodies a reflecting member. The concave mirror 74 is configured such that a reflecting layer made of a metallic material is formed on a resin substrate by deposition. The concave mirror 74 is arranged to face the part in the display unit 72 outputting the display light 82 such that the reflecting surface of the concave mirror 74 is inclined upward. The concave mirror 74 magnifies the display light 82 and reflects the magnified light toward the cover 76. The second gear 80 is provided on the surface of the concave mirror 74 opposite to the reflecting surface. The second gear 80 is in mesh with the first gear 78 of the display device driver 240 so that the angle of the concave mirror 74 is adjustable in association with the rotary driving of the display device driver 240.

For example, the display device driver 240 is comprised of a stepping motor, and the first gear 78 is provided on the rotation axis of the motor. The display device driver 240 is provided in the housing 70, and the first gear 78 is in mesh with the second gear 80 of the concave mirror 74. Rotary driving of the display device driver 240 rotates the first gear 78 and the second gear 80 and changes the angle of projection φ defined as the inclination of normal N on the concave mirror 74 accordingly. Defining the rotation axis of the display device driver 240 to be the origin, and defining an axis extending backward from the origin and a y axis extending vertically from the origin, the angle of projection θ is defined by an angle from the x axis. In other words, the concave mirror 74 is arranged such that the closer the angle of projection to "0°," the closer the normal N to the horizontal direction, and, the closer the angle of projection to "90°," the closer the normal N to the vertical direction. In other words, the angle of projection of the display light 82 in the display device 60 can be changed.

The front windshield 12 of FIG. 1 is a glass window having a predetermined curved surface. The display light 82 output outside from the display device 60 is projected onto the display area 62 of the front windshield 12. The display light 82 reflected by the front windshield 12 reaches the eyes of the driver. The driver views the virtual image of the image represented by the display light 82 reflected by the front windshield 12 as being superimposed on the scenery in front of the vehicle 100. For example, the image may show the speed of the vehicle, the amount of fuel that remains, the distance to the destination, the direction of travel, the geographical name of the current location, the names of facilities and shops located near the current location, etc. Alternatively, the image may be content. Reference is made back to FIG. 2.

The plurality of buttons 50 can be pressed by the driver. The plurality of buttons 50 may be "three" buttons 50 including the first button 50a through the third button 50c, but the number of buttons 50 is not limited to "three," and an arbitrary number of (e.g., four or five) buttons may be provided. The plurality of buttons 50 are connected to the controller 200. The storage unit 210 stores combinations respectively associated with the plurality of buttons 50, each combination including a backward tilt angle and an angle of projection. This is equivalent to storing each of a plurality of items of identification information in association with a combination of a backward tilt angle and an angle of projection. The storage unit 210 may be a storage device and may be provided external to the controller 200.

FIG. 5 shows a data structure of a table stored in the storage unit 210. For example, a combination of a backward tilt angle "A1" and an angle of projection "B1" is stored in association with the first button 50a. Since the backward tilt angle "A1" is realized by the rotation of the seat driver 230 embodied by a stepping motor, a parameter value of the stepping motor that results in the backward tilt angle "A1" may be stored. The parameter value of the stepping motor may be referred to as the backward tilt angle. Since the angle of projection "B1" is realized by the rotation of the display device driver 240 embodied by a stepping motor, a parameter value of the stepping motor that results in the angle of projection "B1" may be stored. The parameter value of the stepping motor may be referred to as the angle of projection. The same is true of the second button 50b and the third button 50c. Reference is made back to FIG. 2.

When one of the plurality of buttons 50 is pressed, the acknowledgment unit 202 of the control unit 220 acknowledges notification from the button 50 that is pressed. As mentioned above, the plurality of buttons 50 are also used to identify a combination of the backward tilt angle and the angle of projection so that the button 50 is equivalent to the identification information in the present disclosure. It can be said that the acknowledgment unit 202 acknowledges an instruction for selection of one of the plurality of items of identification information. In this way, the plurality of items of identification information are respectively identified by mutually different buttons 50.

The control unit 220 refers to the table stored in the storage unit 210 and acquires the backward tilt angle and the angle of projection associated with the button 50 that is pressed. When the first button 50a is pressed, for example, the control unit 220 acquires the backward tilt angle "A1" and the angle of projection "B1" from the storage unit 210. As mentioned above, the backward tilt angle "A1" indicates a parameter value of the stepping motor of the seat driver 230, and the angle of projection "B1" indicates a parameter value of the stepping motor display device driver 240. The control unit 220 outputs the acquired backward tilt angle to the seat driver 230 and outputs the acquired angle of projection to the display device driver 240.

The seat driver 230 acknowledges the backward tilt angle from the control unit 220. The seat driver 230 activates the stepping motor until the parameter value indicated by backward tilt angle results. As a result, the backrest 34 is tilted in a first angle determined by the acknowledged backward tilt angle. The display device driver 240 acknowledges the angle of projection from the control unit 220. The display device driver 240 activates the stepping motor until the parameter value indicated by the angle of projection results. As a result, the display light 82 is inclined in a second angle determined by the acknowledge angle of projection. In other words, the control unit 220 controls the seat 30 so that the first angle determined by the acquired backward tilt angle is set as the backward tilt angle of the backrest and controls the display device 60 so that the second angle determined by the acquired angle of projection is set as the angle of projection of the display device 60. Thus, the first angle encompasses a range between the backward tilt angle in the table stored in the storage unit 210 and the angle actually set in the seat 30. Further, the second angle encompasses a range between the angle of projection in the table stored in the storage unit 210 and the angle actually set in the display device 60. The first angle may be identical to the backward tilt angle, and the second angle may be identical to the angle of projection.

FIGS. 6A-6B show an outline of the operation of the seat 30 and the display device 60. FIG. 6A shows a case where the first button 50a is pressed. The backward tilt angle is set to "A1," and the angle of projection is set to "B1." FIG. 6B shows a case where the second button 50b is pressed. The backward tilt angle is set to "A2," and the angle of projection is set to "B2."

Figure 7:
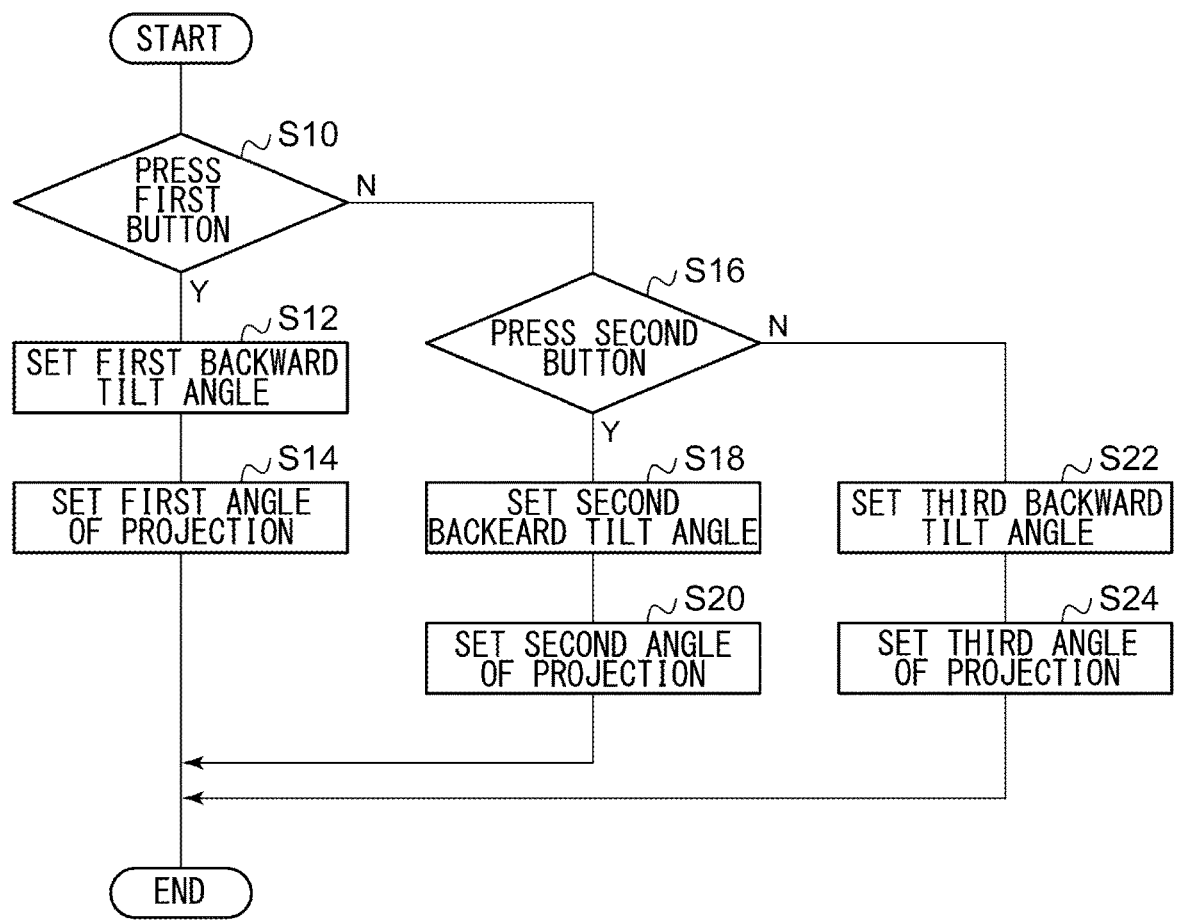
FIG. 7 is a flowchart showing a sequence of steps performed by the controller of FIG. 2.

A description will now be given of the operation of the vehicle 100 having the configuration described above. FIG. 7 is a flowchart showing a sequence of steps performed by the controller 200. When the first button 50a is pressed (Y in S10), the control unit 220 sets the first backward tilt angle "A1" in the seat 30 (S12) and sets the first angle of projection "B1" in the display device 60 (S14). When the first button 50a is not pressed (N in S10) and the second button 50b is pressed (Y in S16), the control unit 220 sets the second backward tilt angle "A2" in the seat 30 (S18) and sets the second angle of projection "B2" in the display device 60 (S20). When the second button 50b is not pressed (N in S16) and the third button 50c is pressed, the control unit 220 sets the third backward tilt angle "A3" in the seat 30 (S22) and sets the third angle of projection "B3" in the display device 60 (S24).

According to this embodiment, combinations each including a backward tilt angle and an angle of projection and respectively associated with the plurality of buttons are stored. The backward tilt angle and the angle of projection associated with the button that is pressed are extracted and output. Therefore, the process is simplified. Further, since the backward tilt angle and the angle of projection are extracted and set in the seat and the display device as the first angle and the second angle, the angles of the seat and the display device can be controlled easily. Further, since the parameter value of the stepping motor is set as the backward tilt angle, a sensor for measuring the angle of the backrest is made unnecessary. Further, since a sensor for measuring the angle of the backrest is made unnecessary, the configuration is simplified. Further, since the parameter value of the stepping motor is set as the angle of projection, a sensor for measuring the angle of the concave mirror is made unnecessary. Further, since a sensor for measuring the angle of the concave mirror is made unnecessary, the configuration is simplified. Further, the identification information is identified by mutually different buttons so that the flexibility of the configuration can be improved.

Embodiment 2

A description will now be given of embodiment 2. Embodiment 2 relates to a controller similar to that of embodiment 1. Embodiment 2 relates to the timing of the setting of the backward tilt angle in the seat and the timing of the setting of the angle of projection in the display device performed after the button is pressed. The vehicle 100 according to embodiment 2 is of the same type as that of FIG. 1. The description below highlights a difference from the foregoing.

Figure 8:
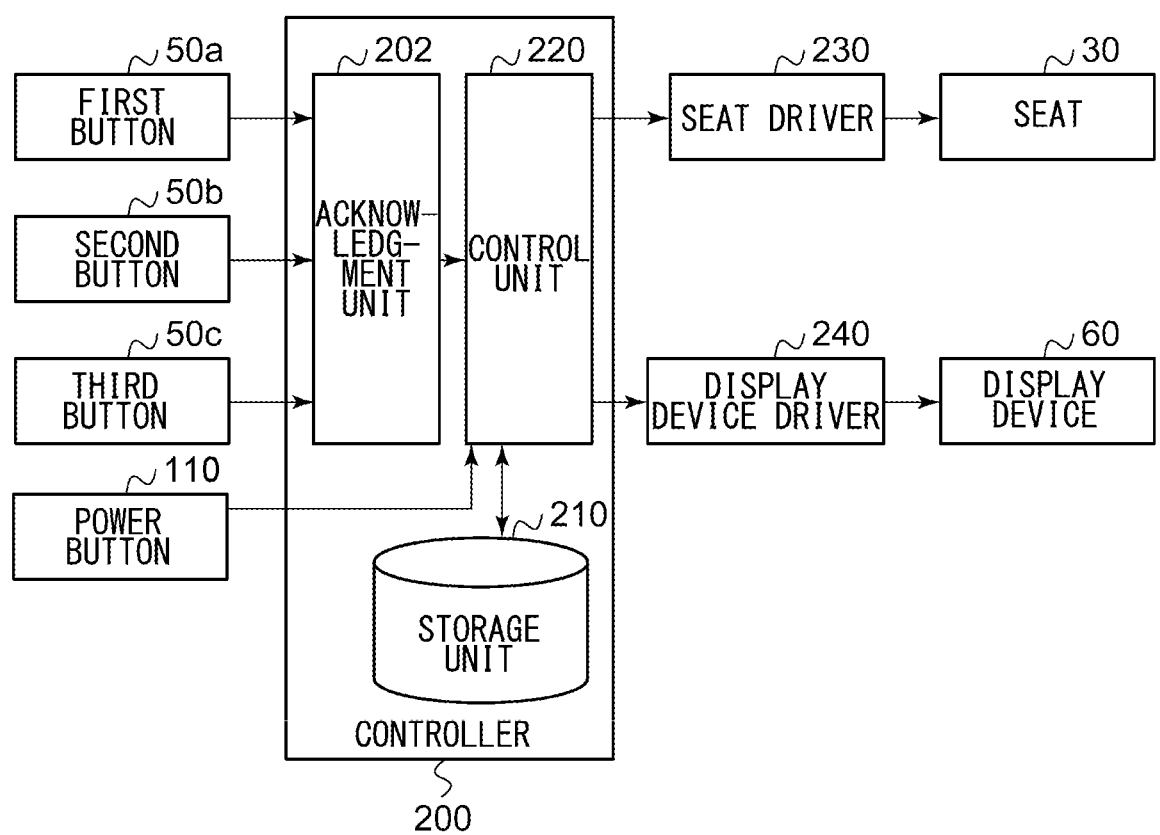
FIG. 8 shows a configuration of the vehicle according to embodiment 2.

FIG. 8 shows a configuration of the vehicle 100. As compared with the configuration of FIG. 2, a power button 110 is added in the vehicle 100. The power button 110 is a button for powering the vehicle 100. When the power button 110 is of a push start button, the status of power makes a transition to turn the accessories on or turn the ignition on, depending on the manner of pressing. The power button 110 outputs a point of time when the accessories are turned on and a point of time when the ignition is turned on to the control unit 220.

Figure 9A:
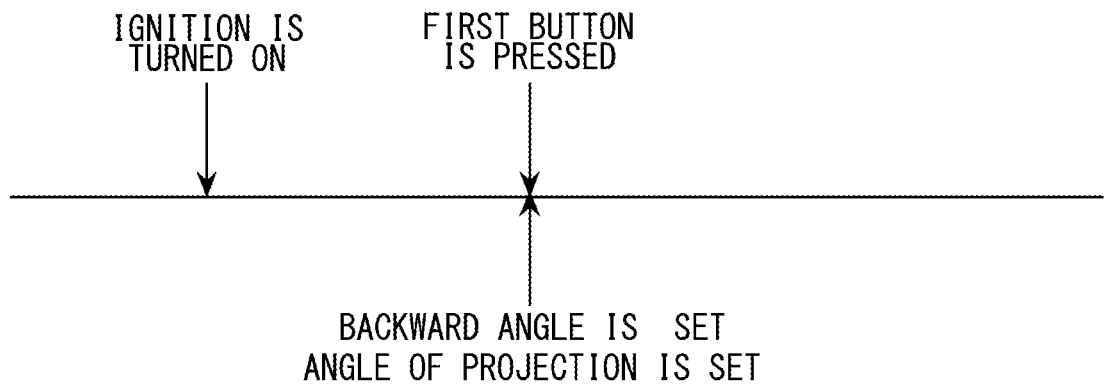
FIGS. 9A and 9B show the timing of the settings in the vehicle of FIG. 8.
Figure 9B:
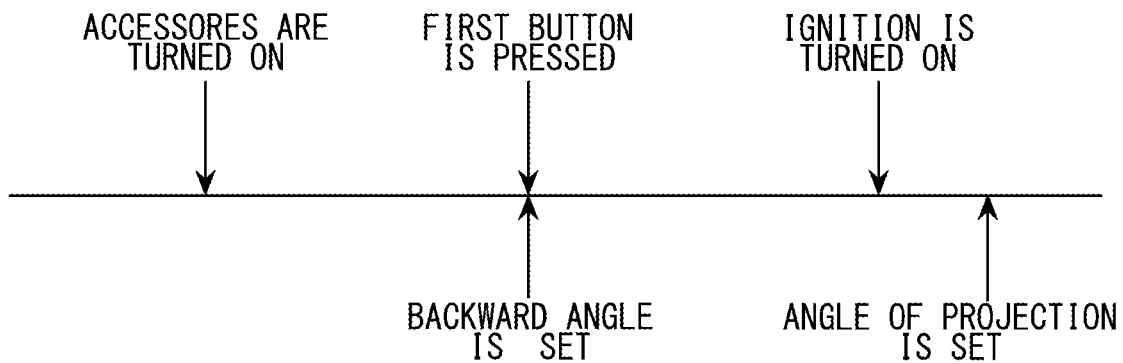

FIGS. 9A-9B show the timing of the settings in the vehicle 100. Referring to FIG. 9A, it is assumed that the first button 50a is pressed after the ignition is turned on by pressing the power button 110. When the control unit 220 acknowledges that the first button 50a is pressed while the ignition is being turned on, the control unit 220 sets the backward tilt angle acquired from the storage unit 210 in the seat 30 and sets the angle of projection acquired from the storage unit 210 in the display device 60 substantially simultaneously. Simultaneous execution means including an error as large as a processing delay. In other words, the absolute value of the difference between the point of time when the backward tilt angle of the backrest is set and the point of time when the angle of projection of the display device 60 is set is configured to be within a first threshold value.

Meanwhile, it is assumed in FIG. 9B that the first button 50a is pressed after the accessories are turned on by the pressing of the power button 110, and, then, the ignition is turned on by the pressing of the power button 110. When the control unit 220 acknowledges that the first button 50a is pressed while the accessories are being turned on, the control unit 220 sets the backward tilt angle acquired from the storage unit 210 in the seat 30. However, the control unit 220 does not set the angle of projection in the display device 60. When the ignition is turned on subsequently, the control unit 220 sets the angle of projection acquired from the storage unit 210 in the display device 60. In other words, the point of time when the control unit 220 sets the acquired backward tilt angle in the seat 30 and the point of time when the control unit 220 sets the acquired angle of projection of the display device 60 are not aligned. The absolute value of the difference between the point of time when the backward tilt angle of the backrest is set and the point of time when the angle of projection of the display device 60 is set is configured to be equal to or larger than a second threshold value.

According to this embodiment, by configuring the absolute value of the difference between the point of time when the backward tilt angle is set and the point of time when the angle of projection is set to be within the first predetermined threshold value, the period of time required for the settings can be reduced. By configuring the absolute value of the difference between the point of time when the backward tilt angle is set and the point of time when the angle of projection is set to be equal to or larger than the second threshold value, the settings can be performed at respectively suitable points of time. Since the timing of the setting of the backward tilt angle and the timing of the setting of the angle of projection can be changed. The settings can be done separately. Therefore, the flexibility of the settings can be improved.

Embodiment 3

A description will now be given of embodiment 3. Embodiment 3 relates to the control device similar to those of the foregoing embodiments. Embodiment 3 relates to switching of the setting performed when switching between automatic driving and manual driving is performed in the vehicle. The vehicle 100 according to embodiment 3 is of the same type as that of FIG. 1. The description below highlights a difference from the foregoing.

Figure 10:
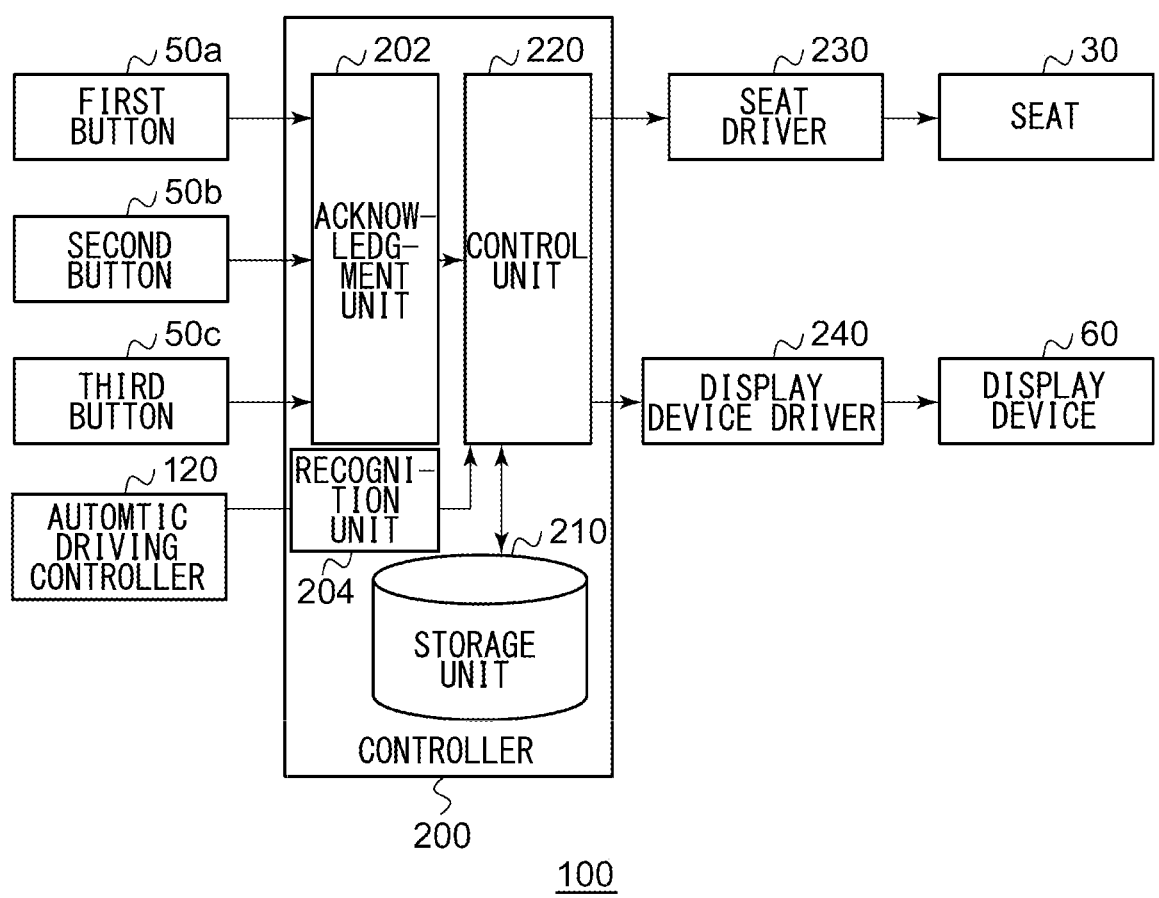
FIG. 10 shows a configuration of the vehicle according to embodiment 3.

FIG. 10 shows a configuration of the vehicle 100. As compared with the configuration of FIG. 2 an automatic driving controller 120 is added in the vehicle 100. Further, a recognition unit 204 is added in the control unit 220. The automatic driving controller 120 performs control for automatic driving in the vehicle 100. A publicly known technology may be used for control for automatic driving, and a description thereof is omitted. Further, the automatic driving controller 120 manages whether the vehicle 100 is being driven automatically or being driven manually. The automatic driving controller 120 outputs driving status information indicating whether the vehicle is being driven automatically or manually to the controller 200.

The recognition unit 204 of the controller 200 acknowledges the driving status information from the automatic driving controller 120. This allows the recognition unit 204 to recognize whether the vehicle 100 is being driven automatically or manually based on the driving status information. The recognition unit 204 outputs the result of recognition to the control unit 220. The storage unit 210 stores the first combination of the backward tilt angle and the angle of projection for automatic driving and the second combination of the backward tilt angle and the angle of projection for manual driving, associating the combinations with each of the plurality of buttons 50. FIG. 11 shows a data structure of a table stored in the storage unit 210. For example, the first combination of the backward tilt angle "A1" and the angle of projection "B1" for automatic driving and the second combination of the backward tilt angle "C1" and the angle of projection "D1" for manual driving are listed in association with the first button 50a. FIG. 1 is a figure equivalent to FIG. 5. The same is true of the second button 50b and the third button 50c. Reference is made back to FIG. 10.

When the recognition unit 204 recognizes that the vehicle is being driven automatically, the control unit 220 refers to the table stored in the storage unit 210 and acquires the first combination associated with the button 50 that is pressed. When the first button 50a is pressed while the vehicle is being driven automatically, the control unit 220 acquires, for example, the backward tilt angle "A1" and the angle of projection "B1" from the storage unit 210. Further, when the recognition unit 204 recognizes that the vehicle is being driven manually, the control unit 220 refers to the table stored in the storage unit 210 and acquires the second combination associated with the button 50 that is pressed. When the first button 50a is pressed while the vehicle is being driven manually, the control unit 220 acquires, for example, the backward tilt angle "C1" and the angle of projection "D1" from the storage unit 210.

According to this embodiment, different combinations are acquired depending on whether the vehicle is being driven automatically or manually. Accordingly, the backward tilt angle of the backrest and the angle of projection can be set to suit automatic driving and manual driving. Since the setting is also switched when switching between automatic driving and manual driving is performed so that user convenience can be improved.

Embodiment 4

A description will now be given of embodiment 4. Embodiment 4 relates to the controller similar to those of the foregoing embodiments. Embodiment 4 relates to a process of causing the storage unit to store a backward tilt angle and an angle of projection. The vehicle 100 according to embodiment 4 is of the same type as that of FIG. 1. The description below highlights a difference from the foregoing.

Figure 12:
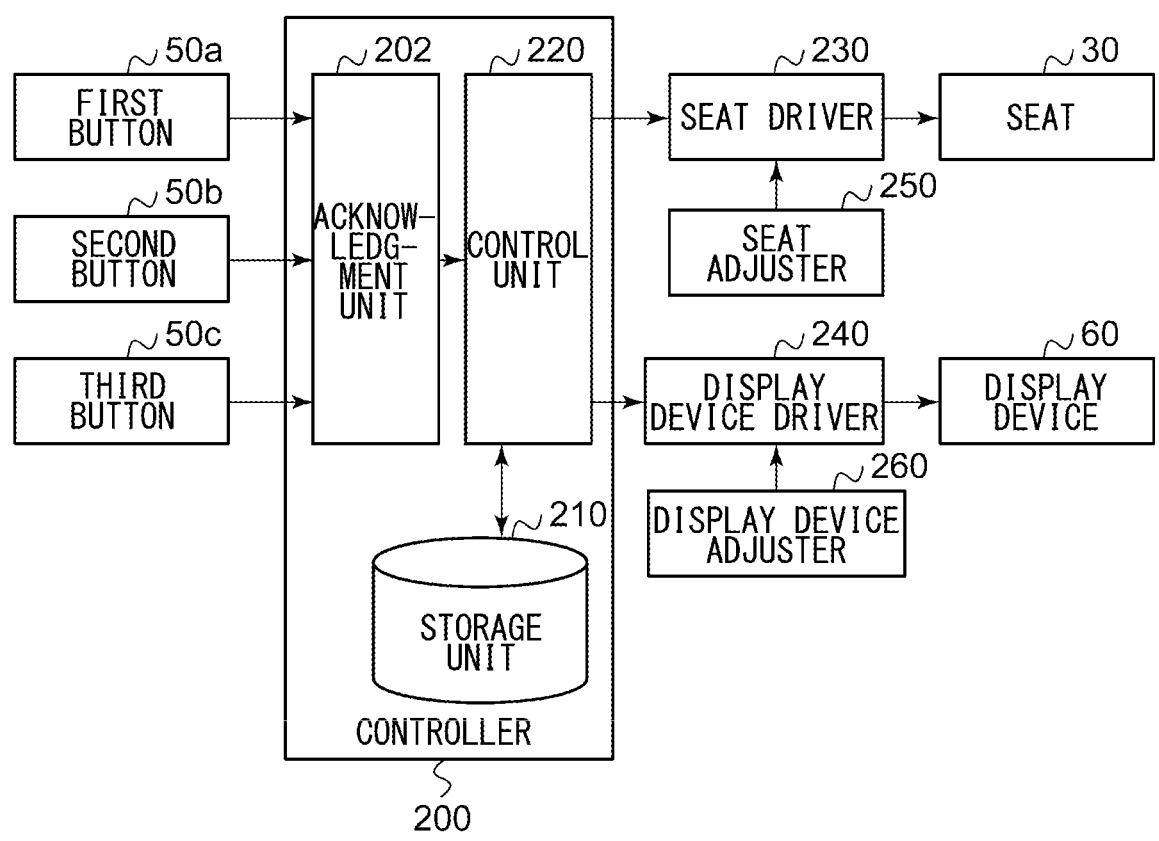
FIG. 12 shows a configuration of the vehicle according to embodiment 4.

FIG. 12 shows a configuration of the vehicle 100. As compared with the configuration of FIG. 2, a seat adjuster 250 and a display device adjuster 260 are added in the vehicle 100. The seat adjuster 250 adjusts the backward tile angle of the seat 30 according to a user operation. The display device adjuster 260 adjusts the angle of projection of the display device 60 according to a user operation. The seat adjuster 250 and the display device adjuster 260 can be operated independently.

FIG. 13 shows a data structure of a table stored in the storage unit 210. A user operation in each button 50 for instructing the storage unit 210 to store the angle(s) is entered in the "user operation" field. For example, the table shows that, when the user operation is "hold" of the first button 50a, the storage unit 210 is caused to store the combination of the backward tilt angle and the angle of projection in association with the first button 50a. The table also shows that, when the user operation is "press twice" of the first button 50a, the storage unit 210 is caused to store the backward tilt angle in association with the first button 50a. The table further shows that, when the user operation is "press three times" of the first button 50a, the storage unit 210 is caused to store the angle of projection in association with the first button 50a. The same is true of the second button 50b and the third button 50c. Reference is made back to FIG. 12.

When any of the buttons 50 is "held" or "pressed twice" or "pressed three times," the acknowledgment unit 202 acknowledges an instruction for storage in the storage unit 210. In this case, "hold" is an example of the first instruction, "press twice" is an example of the second instruction, and "press three times" is an example of the third instruction. In this way, the first instruction, the second instruction, and the third instruction are different. When the acknowledgment unit 202 acknowledges the first instruction as the instruction for storage, the control unit 220 causes the storage unit 210 to store the combination of the backward tilt angle and the angle of projection associated with the button 50 that is used. When the acknowledgment unit 202 acknowledges the second instruction as the instruction for storage, the control unit 220 causes the storage unit 210 to store the backward tilt angle associated with the button 50 that is used. When the acknowledgment unit 202 acknowledges the third instruction as the instruction for storage, the control unit 220 causes the storage unit 210 to store the angle of projection associated with the button 50 that is used. In other words, the acknowledgment unit 202 additionally acknowledges an instruction for storage including identification information, based on a predetermined user operation. Further, when an instruction for storage is acknowledged, the control unit 220 updates, in accordance with the instruction for storage, at least one of the backward tilt angle of the backrest and the angle of projection in the storage unit 210 associated with the identification information included in the instruction for storage.

According to this embodiment, the first instruction, the second instruction, and the third instruction are different so that the content stored can be changed by changing instructions. Further, since a predetermine user operation is acknowledged, the content stored can be changed depending on a user operation. Further, since the content stored is changed, the flexibility of user operation can be improved.

Embodiment 5

A description will now be given of embodiment 5. Embodiment 5 relates to the control device similar to those of the foregoing embodiments. In the foregoing embodiments, each of the plurality of items of identification information is identified by a button. Meanwhile, each of the plurality of items of identification information is identified by a means other than a button in embodiment 5. The vehicle 100 according to embodiment 5 is of the same type as that of FIG. 1. The description below highlights a difference from the foregoing.

Figure 14A:
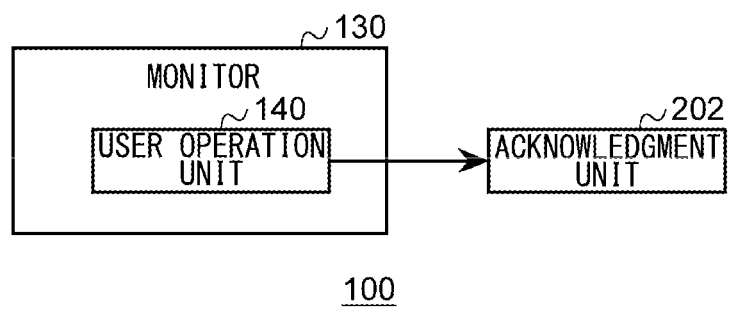
FIGS. 14A and 14B show a configuration of the vehicle according to embodiment 5.
Figure 14B:
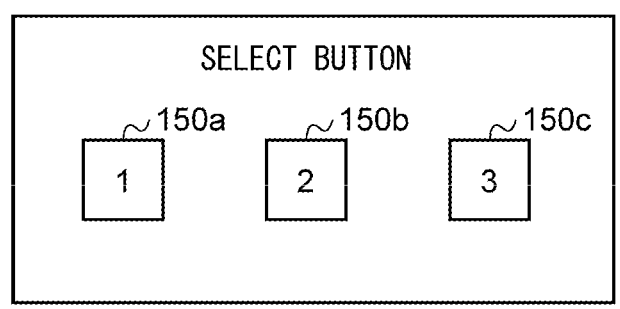

FIGS. 14A-14B show a configuration of the vehicle 100. FIG. 14A shows a configuration in the vehicle 100 provided in the input stage of the acknowledgment unit 202. The illustrated configuration corresponds to the first button 50a through the third button 50c and the acknowledgment unit 202. A monitor 130 is mounted in, for example, the dashboard 10 of FIG. 1 and displays map information, etc. For example, the monitor 130 may be configured to include a liquid crystal display (LCD), an organic light emitting diode (OLED), or the like. The monitor 130 may be a center display, a meter display, or the like in the vehicle 100. The monitor 130 may be the same as the display device 60. The monitor 130 is an example of the display device or the second display device according to this disclosure.

An exemplary screen presented on the monitor 130 is shown in FIG. 14B. In this screen, a first button 150a through a third button 150c are displayed. The first button 150a through the third button 150c correspond to the first button 50a through the third button 50c, respectively. The monitor 130 is, for example, a touch-sensitive panel, and the touch-sensitive function is implemented by a user operation unit 140. When the user touches the first button 150a displayed on the monitor 130, the user operation unit 140 outputs information indicating that the first button 150a is selected to the acknowledgment unit 202. In other words, each of the plurality of items of identification information is identified by an option displayed on the monitor 130. The storage unit 210 and the control unit 220 are as described above.

Figure 15A:
FIGS. 15A-15C show alternative configurations in the vehicle according to embodiment 5.
Figure 15B:
Figure 15C:
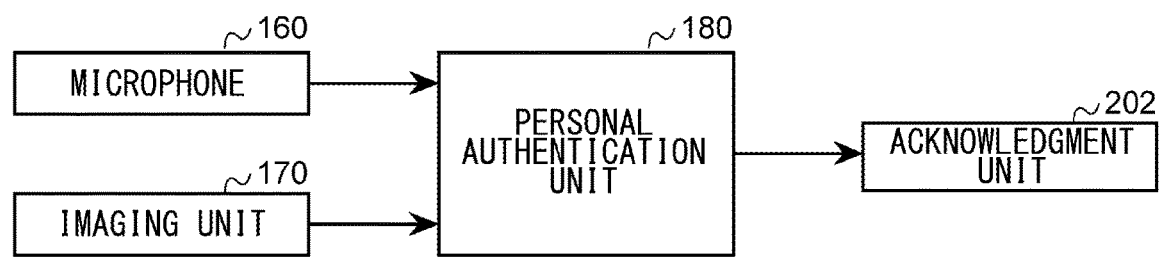

FIG. 15A-15C show alternative configurations in the vehicle 100. Like FIG. 14A, FIG. 15A shows a configuration in the vehicle 100 provided in the input stage of the acknowledgment unit 202. A microphone 160 receives a sound message originated by the user. The microphone 160 outputs the received sound message to a sound recognition unit 162. The sound recognition unit 162 acquires the content of the sound message by subjecting the sound message to a sound recognition process. "First button," "second button," and "third button" are defined as the content of the sound message. The sound recognition unit 162 outputs information indicating one of "first button," "second button," and "third button" selected to the acknowledgment unit 202. In other words, each of the plurality of items of identification information is identified by a difference between sound messages recognized. The storage unit 210 and the control unit 220 are as described above.

Like FIG. 14A, FIG. 15B shows a configuration in the vehicle 100 provided in the input stage of the acknowledgment unit 202. An imaging unit 170 captures an image of the user in the vehicle. The imaging unit 170 outputs the captured image to an image recognition unit 172. The image recognition unit 172 acquires the content of the image by subjecting the image to an image recognition process. A gesture corresponding to "first identification information," a gesture corresponding to "second identification information," and a gesture corresponding to "third identification information" are defined as the content of the image. The first identification information through the third identification information correspond to the first button through the third button described above. The sound recognition unit 162 outputs information indicating one of "first identification information," "second identification information," and "third identification information" selected to the acknowledgment unit 202. In other words, each of the plurality of items of identification information is identified by a difference between gestures recognized. The storage unit 210 and the control unit 220 are as described above, except that combinations each including the backward tilt angle and the angle of projection are stored in the storage unit 210 in association with the items of identification information.

At least a part of a facial image (e.g., the position of the eyes) corresponding to "first identification information," the position of the eyes corresponding to "second identification information," and the position of the eyes corresponding to "third identification information" may be defined as the content of the image in the image recognition unit 172. The sound recognition unit 162 outputs information indicating one of "first identification information," "second identification information," and "third identification information" selected to the acknowledgment unit 202. In other words, each of the plurality of items of identification information is identified by a difference between positions of at least a part of the facial image recognized. The control unit 220 is as described above.

Like FIG. 14A, FIG. 15C shows a configuration in the vehicle 100 provided in the input stage of the acknowledgment unit 202. The microphone 160 and the imaging unit 170 are as described already. A personal authentication unit 180 recognizes the user based on at least one of the sound from the imaging unit 170 and the image from the imaging unit 170. A publicly known technology may be used for personal identification. For example, personal identification may be made based on a face included in the image, a gesture, or sound. A person corresponding to "first identification information," a person corresponding to "second identification information," and a person corresponding to "third identification information" are defined in the personal authentication unit 180. The personal authentication unit 180 outputs information indicating one of "first identification information," "second identification information," and "third identification information" selected to the acknowledgment unit 202. In other words, each of the plurality of items of identification information is identified by a difference between persons identified by personal authentication. The control unit 220 is as described already.

According to this embodiment, the identification information is identified by an option displayed on the monitor so that the flexibility of the configuration can be improved. Further, by identifying the identification information according to a difference between sound messages recognized, the flexibility of the configuration can be improved. Further, by identifying the identification information according to a difference between gestures recognized, the flexibility of the configuration can be improved. Further, by identifying the identification information according to a difference between positions of at least a part of the facial image recognized, the flexibility of the configuration can be improved. Further, by identifying the identification information according to a difference between persons identified by personal authentication, the flexibility of the configuration can be improved.

Embodiments according to the present disclosure have been described above in detail with reference to the drawings, and the functions of the devices and processing parts described above can be implemented by a computer program. The computer that realizes the functions described above includes: an input device such as a keyboard, mouse, and touch-sensitive pad; an output device such as a display and a speaker; one or more processors (e.g., a central processing unit (CPU), a graphical processor unit (GPU)); one or more memories (e.g., ROM, RAM, etc.); a storage device such as a hard disk device and a solid state drive (SSD); a reader that reads information from a recording medium such as a digital versatile disk read only memory (DVD-ROM) and a USB memory; and a network card that performs communication via a network, and the components are connected by way of a bus.

Further, the reader reads the program from the recording medium encoded with the program and causes the storage device to store the program. Alternatively, the network card communicates with a server device connected to the network and causes the storage device to store the program downloaded from the server device and realizing the functions of the respective devices described above. Further, the CPU copies the program stored in the storage device to the RAM, sequentially reads instructions included in the program from the RAM and executes the instructions accordingly, thereby realizing the functions of the respective devices described above.

A summary of one embodiment of the present disclosure is as follows. A controller according to an embodiment of the present disclosure is connected to a seat for which a backward tilt angle of a backrest can be changed and to a display device for which an angle of projection of a display light can be changed, and includes: an acknowledgment unit that acknowledges a selection of one of a plurality of items of identification information; a control unit that acquires, when the acknowledgment unit acknowledges a selection of one of the plurality of items of identification information, a backward tilt angle and an angle of projection corresponding to the selected identification information from a storage unit to control the seat so that a first angle determined by the backward tilt angle acquired is set as the backward tilt angle of the backrest and to control the display device so that a second angle determined by the angle of projection acquired is set as the angle of projection of the display device.

According to this embodiment, the combination of the backward tilt angle and the angle of projection associated with each of the plurality of items of identification information are stored, and the backward tilt angle and the angle of projection associated with the pressed identification information are set in the seat and the display device. Accordingly, the angles of the seat and the display device can be controlled easily.

The storage unit may store each of the plurality of items of identification information in association with a combination of the backward tilt angle and the angle of projection. In this case, each of the plurality of items of identification information is stored in association with a combination of the backward tilt angle and the angle of projection so that the process is simplified.

An absolute value of a difference between a point of time when the first angle is set as the backward tilt angle of the backrest and a point of time when the second angle is set as the angle of projection of the display device may be within a first threshold value. In this case, an absolute value of a difference between a point of time when the backward tilt angle is set and a point of time when the angle of projection is set is within a first threshold value so that the period of time required for the settings can be reduced.

An absolute value of a difference between a point of time when the first angle is set as the backward tilt angle of the backrest and a point of time when the second angle is set as the angle of projection of the display device may be equal to or larger than a second threshold value. In this case, an absolute value of a difference between a point of time when the backward tilt angle is set and a point of time when the angle of projection is set is equal to or larger than a second threshold value so that the settings can be performed at respectively suitable points of time.

The controller may further include a recognition unit that recognizes whether a vehicle in which the controller is mounted is being driven automatically or manually. The storage unit may store each of the plurality of items of identification information in association with a first combination of the backward tilt angle and the angle of projection for automatic driving, and a second combination of the backward tilt angle and the angle of projection for manual driving. When the recognition unit recognizes that the vehicle is being driven automatically, the controller may acquire the first combination corresponding to the selected identification information from the storage unit to control the seat so that the first angle determined by the backward tilt angle included in the first combination acquired is set as the backward tilt angle of the backrest and to control the display device so that the second angle determined by the angle of projection included in the first combination acquired is set as the angle of projection of the display device, and when the recognition unit recognizes that the vehicle is being driven manually, the controller acquires the second combination corresponding to the selected identification information from the storage unit to control the seat so that the first angle determined by the backward tilt angle included in the second combination acquired is set as the backward tilt angle of the backrest and to control the display device so that the second angle determined by the angle of projection included in the second combination acquired is set as the angle of projection of the display device, In this case, different combinations are acquired depending on whether the vehicle is being driven automatically or manually so that the settings suited to automatic driving and manual driving can be performed.

The controller may be mounted in a vehicle, and the controller may further include: an announcement unit that announces, in the vehicle, information related to the backward tilt angle and the angle of projection set by the control unit. In this case, the information related to the backward tilt angle and the angle of projection is announced so that the information related to the backward tilt angle and the angle of projection can be made known.

The acknowledgment unit may further acknowledge an instruction for storage including identification information, based on a predetermined user operation, and, when the acknowledgment unit acknowledges the instruction for storage, the control unit may update, based on the instruction for storage, at least one of the backward tilt angle of the backrest and the angle of projection associated in the storage unit with the identification information included in the instruction for storage. The "instruction for storage" may include at least one of "the currently set backward tilt angle and the currently set angle of projection" along with the "identification information." In this case, a predetermined use operation is acknowledged so that the content stored can be changed depending on the user operation.

The controller may be mounted in a vehicle, a plurality of buttons may be provided in the vehicle, and, when one of the plurality of buttons is pressed, the acknowledgment unit may acknowledge a selection of the identification information, of the plurality of items of identification information, corresponding to the button. In this case, the identification information is identified by mutually different buttons so that the flexibility of the configuration can be improved.

The controller may be mounted in a vehicle, a second display device may be provided in the vehicle, and, when one of a plurality of options displayed on the display device or on the second display device is selected, the acknowledgment unit may acknowledge a selection of the identification information, of the plurality of items of identification information, corresponding to the selected option. In this case, the identification information is identified by an option displayed on the second display device so that the flexibility of the configuration can be improved.

The controller may be mounted in a vehicle, a sound input unit may be provided in the vehicle, and, when sound is input in the sound input unit, the acknowledgment unit may acknowledge a selection of the identification information, of the plurality of items of identification information, corresponding to a result of recognition of the sound. In this case, the identification information is identified by a difference between results of recognition of the sound so that the flexibility of the configuration can be improved.

The controller may be mounted in a vehicle, and the controller may further include a recognition unit that recognizes a gesture of a user in the vehicle. The acknowledgment unit may acknowledge a selection of one of the plurality of items of identification information, based on a result of recognition of the gesture by the recognition unit. In this case, the identification information is identified by a difference between gestures recognized so that the flexibility of the configuration can be improved.

The controller may be mounted in a vehicle, and the controller may further include an acquisition unit that acquires a facial image of a user in the vehicle. The acknowledgment unit may acknowledge a selection of one of the plurality of items of identification information, based on a position of at least a part of a face of the user recognized based on the facial image of the user acquired by the acquisition unit. In this case, the identification information is identified by a difference between positions of at least a part of the facial image recognized so that the flexibility of the configuration can be improved.

The controller may be mounted in a vehicle, and the controller may further include: an acquisition unit that acquires information on a user in the vehicle; and an authentication unit identifies who the user is, based on the information on the user. The acknowledgment unit may acknowledge a selection of one of the plurality of items of identification information, based on a result of identification by the authentication unit. In this case, the identification information is identified by a difference between persons identified by personal authentication so that the flexibility of the configuration can be improved.

The controller may be mounted in a vehicle, and the controller may further include: an acquisition unit that acquires information on a point of view of a user in the vehicle. The control unit may adjust the second angle, based on the information on the point of view acquired by the acquisition unit. In this case, the second angle is adjusted based on the information on the point of view so that the image can be displayed at a position easily viewed by the user.

The first angle may be equal to the backward tile angle acquired by the control unit, and the second angle may be equal to the angle of projection acquired by the control unit. In this case, the first angle and the backward tilt angle are equal, and the second angle and the angle of projection are equal so that the precision of control can be improved.

Another embodiment of the present disclosure relates to a vehicle. The vehicle includes: a seat for which a backward tilt angle of a backrest can be changed; a display device for which an angle of projection of a display light can be changed; an acknowledgment unit that acknowledges a selection of one of a plurality of items of identification information; a storage unit; and a control unit that acquires, when the acknowledgment unit acknowledges a selection of one of the plurality of items of identification information, a backward tilt angle and an angle of projection corresponding to the selected identification information from the storage unit to control the seat so that a first angle determined by the backward tilt angle acquired is set as the backward tilt angle of the backrest and to control the display device so that a second angle determined by the angle of projection acquired is set as the angle of projection of the display device.

According to this embodiment, the combination of the backward tilt angle and the angle of projection associated with each of the plurality of items of identification information are stored, and the backward tilt angle and the angle of projection associated with the pressed identification information are set in the seat and the display device. Accordingly, the angles of the seat and the display device can be controlled easily.

Still another embodiment of the present disclosure relates to a control method. The method is adapted for a controller connected to a seat for which a backward tilt angle of a backrest can be changed and to a display device for which an angle of projection of a display light can be changed, and includes: acknowledging a selection of one of a plurality of items of identification information; acquiring, when a selection of one of the plurality of items of identification information is acknowledged, a backward tilt angle and an angle of projection corresponding to the selected identification information from a storage unit; and controlling, using a processor, the seat so that a first angle determined by the backward tilt angle acquired is set as the backward tilt angle of the backrest and controlling, using the processor, the display device so that a second angle determined by the angle of projection acquired is set as the angle of projection of the display device.

Described above is an explanation of the present disclosure based on an exemplary embodiment. The embodiment is intended to be illustrative only and it will be understood by those skilled in the art that various modifications to combinations of constituting elements and processes are possible and that such modifications are also within the scope of the present disclosure.

In embodiments 1 through 5, the control unit 220 controls the angle of projection of the display device 60 only in accordance with the identification information represented by the pressed button 50, etc. Alternatively, however, a sensor for detecting the point of view of the driver, i.e., the observer, may be provided, for example. In that case, the sensor outputs the point of view detected to the controller 200 as point of view information. The acquisition unit provided in the controller 200 acquires the point of view information, and the control unit 220 may adjust the angle of projection based on the point of view information acquired by the acquisition unit. The adjustment can be said to be fine adjustment of the position of projection. According to this variation, the angle of projection is adjusted based on the point of view information so that the image can be displayed at a position easily viewed by the driver.

In embodiments 1 through 5, an announcement unit that announces information related to the backward tilt angle and the angle of projection set by the control unit 220 may further be provided. The announcement unit announces information from the display device 60, the monitor 130, or the speaker. According to this variation, the information related to the backward tilt angle and the angle of projection is announced so that the information related to the backward tilt angle and the angle of projection can be made known.

In embodiments 1 through 4, the plurality of buttons 50 are provided in the vehicle 100. Alternatively, however, the button 50 or the button 150 may be provided in, for example, a communication device capable of communicating with the controller 200. Examples of the communication device include a cellular phone such as a smartphone, a remote controller, and a key (smart key) of the vehicle 100. In that case, one button 50 or one button 150 may be provided in the communication device, or a plurality of buttons 50 or buttons 150 may be provided. According to this variation, the flexibility of the configuration can be improved.

While various embodiments have been described herein above, it is to be appreciated that various changes in form and detail may be made without departing from the spirit and scope of the disclosure (s) presently or hereafter claimed.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A controller configured to be mounted on a vehicle and connected to a seat for which a backward tilt angle of a backrest can be changed and to a display device for which an angle of projection of a display light can be changed, the controller comprising:
a central processing unit (CPU); and
a storage, the storage stores a command executable by the CPU, and the controller causing the CPU to execute the command,
wherein the CPU:
acknowledges a selection of one of a plurality of items of identification information; and
acquires, in a case where the CPU acknowledges the selection of one of the plurality of items of identification information, a backward tilt angle and an angle of projection corresponding to the selected identification information from the storage to control the seat so that a first angle determined by the backward tilt angle acquired is set as the backward tilt angle of the backrest and to control the display device so that a second angle determined by the angle of projection acquired is set as the angle of projection of the display device,
wherein, in a case where the one of the plurality of items of identification information is selected after an ignition of the vehicle is turned on, the seat is controlled so that the first angle is set as the backward tilt angle of the backrest after the ignition of the vehicle is turned on and the display device is controlled so that the second angle is set as the angle of projection of the display device after the ignition of the vehicle is turned on, and
wherein, in a case where the one of the plurality of items of identification information is selected before the ignition of the vehicle is turned on, the seat is controlled so that the first angle is set as the backward tilt angle of the backrest before the ignition of the vehicle is turned on and the display device is controlled so that the second angle is set as the angle of projection of the display device after the ignition of the vehicle is turned on.

2. The controller according to claim 1, wherein the storage stores each of the plurality of items of identification information in association with a combination of the backward tilt angle and the angle of projection.

3. The controller according to claim 1, wherein the storage stores each of the plurality of items of identification information in association with a first combination of the backward tilt angle and the angle of projection for automatic driving, and a second combination of the backward tilt angle and the angle of projection for manual driving, wherein the CPU:
recognizes whether the vehicle in which the controller is mounted is being driven automatically or manually;
acquires, when the CPU recognizes that the vehicle is being driven automatically, the first combination corresponding to the selected identification information from the storage to control the seat so that the first angle determined by the backward tilt angle included in the first combination acquired is set as the backward tilt angle of the backrest and to control the display device so that the second angle determined by the angle of projection included in the first combination acquired is set as the angle of projection of the display device, and acquires, when the CPU recognizes that the vehicle is being driven manually, the second combination corresponding to the selected identification information from the storage to control the seat so that the first angle determined by the backward tilt angle included in the second combination acquired is set as the backward tilt angle of the backrest and to control the display device so that the second angle determined by the angle of projection included in the second combination acquired is set as the angle of projection of the display device.

4. The controller according to claim 1, wherein the controller is mounted in the vehicle; and the CPU announces, in the vehicle, information related to the backward tilt angle and the angle of projection set.

5. The controller according to claim 1, wherein the CPU: further acknowledges an instruction for storage including identification information, based on a predetermined user operation; and
when the CPU acknowledges the instruction for storage, updates, based on the instruction for storage, at least one of the backward tilt angle of the backrest and the angle of projection associated in the storage with the identification information included in the instruction for storage.

6. The controller according to claim 1, wherein the controller is mounted in the vehicle;
a plurality of buttons are provided in the vehicle; and the CPU acknowledges, when one of the plurality of buttons is pressed, a selection of the identification information, of the plurality of items of identification information, corresponding to the button.

7. The controller according to claim 1, wherein the controller is mounted in the vehicle;
a second display device is provided in the vehicle; and the CPU acknowledges, when one of a plurality of options displayed on the display device or on the second display device is selected, a selection of the identification information, of the plurality of items of identification information, corresponding to the selected option.

8. The controller according to claim 1, wherein the controller is mounted in the vehicle;
a sound input unit is provided in the vehicle; and the CPU acknowledges, when sound is input in the sound input unit, a selection of the identification information, of the plurality of items of identification information, corresponding to a result of recognition of the sound.

9. The controller according to claim 1, wherein the controller is mounted in the vehicle; and the CPU:
recognizes a gesture of a user in the vehicle; and acknowledges a selection of one of the plurality of items of identification information, based on a result of recognition of the gesture.

10. The controller according to claim 1, wherein the controller is mounted in the vehicle; and the CPU:
acquires a facial image of a user in the vehicle; and acknowledges a selection of one of the plurality of items of identification information, based on a position of at least a part of a face of the user recognized based on the facial image of the user acquired.

11. The controller according to claim 1, wherein the controller is mounted in the vehicle; and the CPU:
acquires information on a user in the vehicle; identifies who the user is, based on the information on the user; and
acknowledges a selection of one of the plurality of items of identification information, based on a result of identification.

12. The controller according to claim 1, wherein the controller is mounted in the vehicle; and the CPU:
acquires information on a point of view of a user in the vehicle; and
adjusts the second angle, based on the information on the point of view acquired.

13. The controller according to claim 1, wherein the first angle is equal to the backward tile angle acquired; and
the second angle is equal to the angle of projection acquired.

14. A vehicle, comprising:
a seat for which a backward tilt angle of a backrest can be changed;
a display device for which an angle of projection of a display light can be changed;
a controller that acknowledges a selection of one of a plurality of items of identification information; and
a storage,
wherein the controller acquires, in a case where the controller acknowledges the selection of one of the plurality of items of identification information, a backward tilt angle and an angle of projection corresponding to both-the selected identification information from the storage to control the seat so that a first angle determined by the backward tilt angle acquired is set as the backward tilt angle of the backrest and to control the display device so that a second angle determined by the angle of projection acquired is set as the angle of projection of the display device,
wherein, in a case where the one of the plurality of items of identification information is selected after an ignition of the vehicle is turned on, the seat is controlled so that the first angle is set as the backward tilt angle of the backrest after the ignition of the vehicle is turned on and the display device is controlled so that the second angle is set as the angle of projection of the display device after the ignition of the vehicle is turned on, and
wherein, in a case where the one of the plurality of items of identification information is selected before the ignition of the vehicle is turned on, the seat is controlled so that the first angle is set as the backward tilt angle of the backrest before the ignition of the vehicle is turned on and the display device is controlled so that the second angle is set as the angle of projection of the display device after the ignition of the vehicle is turned on.

15. A control method adapted for a controller configured to be mounted on a vehicle and connected to a seat for which a backward tilt angle of a backrest can be changed and to a display device for which an angle of projection of a display light can be changed, the control method comprising:
acknowledging a selection of one of a plurality of items of identification information;
acquiring, in a case where a selection of one of the plurality of items of identification information is acknowledged, a backward tilt angle and an angle of projection corresponding to both the selected identification information from a storage; and controlling, using a processor, the seat so that a first angle determined by the backward tilt angle acquired is set as the backward tilt angle of the backrest and controlling, using the processor, the display device so that a second angle determined by the angle of projection acquired is set as the angle of projection of the display device, wherein, in a case where the one of the plurality of items of identification information is selected after an ignition of the vehicle is turned on, the seat is controlled so that the first angle is set as the backward tilt angle of the backrest after the ignition of the vehicle is turned on and the display device is controlled so that the second angle is set as the angle of projection of the display device after the ignition of the vehicle is turned on, and wherein, in a case where the one of the plurality of items of identification information is selected before the ignition of the vehicle is turned on, the seat is controlled so that the first angle is set as the backward tilt angle of the backrest before the ignition of the vehicle is turned on and the display device is controlled so that the second angle is set as the angle of projection of the display device after the ignition of the vehicle is turned on.

* * * * *